US009384685B2

(12) United States Patent
Davis et al.

(10) Patent No.: US 9,384,685 B2
(45) Date of Patent: Jul. 5, 2016

(54) METHOD FOR DEPLOYMENT OF A DISPLAY SYSTEM

(75) Inventors: Adam Davis, Leola, PA (US); Frederic Frank Opsomer, Kortemark (BE)

(73) Assignee: Tait Towers Manufacturing, LLC, Lititz, PA (US)

( * ) Notice: Subject to any disclaimer, the term of this patent is extended or adjusted under 35 U.S.C. 154(b) by 107 days.

(21) Appl. No.: 13/543,068

(22) Filed: Jul. 6, 2012

(65) Prior Publication Data

US 2013/0232770 A1 Sep. 12, 2013

(30) Foreign Application Priority Data

Mar. 9, 2012 (BE) .................................. 2012/0156

(51) Int. Cl.

*H01S 4/00* (2006.01)
*G09F 19/22* (2006.01)
*G09F 9/33* (2006.01)

(52) U.S. Cl.

CPC *G09F 19/22* (2013.01); *G09F 9/33* (2013.01); *G09F 19/226* (2013.01); *Y10T 29/49002* (2015.01)

(58) Field of Classification Search

CPC ......... G09F 9/33; G09F 19/226; G09F 19/22; Y10T 29/49002

USPC ........... 29/592.1; 160/242, 84.01, 84.02, 113, 160/135; 40/610, 600, 448, 789, 777, 436, 40/606.14, 606.16, 601; 348/836, 840, 348/843; 434/430, 428, 432

See application file for complete search history.

(56) References Cited

U.S. PATENT DOCUMENTS

| | | | | |
|---|---|---|---|---|
| 4,657,149 A * | 4/1987 | Masson | A47F 5/105 160/135 |
| 6,704,989 B1 * | 3/2004 | Lutz | G09F 9/30 29/426.1 |
| 2010/0146832 A1 * | 6/2010 | Gimpel | G09F 11/21 40/604 |

FOREIGN PATENT DOCUMENTS

| | | | |
|---|---|---|---|
| EP | 1798709 | A1 | 6/2007 |
| WO | 0123688 | A1 | 4/2001 |
| WO | 2007035992 | A1 | 4/2007 |

* cited by examiner

*Primary Examiner* — Peter DungBa Vo
*Assistant Examiner* — Azm Parvez
(74) *Attorney, Agent, or Firm* — McNees Wallace & Nurick LLC

(57) ABSTRACT

A method for deployment of a display system includes providing a first collection container for receiving a first display arrangement, and a second collection container for receiving a second display arrangement. The method further includes positioning the first collection container and the second collection container in close proximity to one another. The method further includes selectably engaging the first display arrangement to the second display arrangement and simultaneously deploying the first and second display arrangements.

11 Claims, 10 Drawing Sheets

METHOD FOR DEPLOYMENT OF A DISPLAY SYSTEM

FIELD OF THE INVENTION

The present invention relates to displays and processes of erecting and disassembling displays. More specifically, the present invention relates to simultaneous deployment of flexible displays, processes, and engagement devices.

BACKGROUND OF THE INVENTION

In the performance industry, video displays are used in conjunction with multi-media systems utilized in productions. Video displays can be limited in size due to the complexity of arranging the video displays and/or due to the issues associated with weight distribution.

When being used as part of a touring production, video displays are often consolidated and stored for transportation. Known systems are rigid and require significant time for arranging (for example, consolidating, disassembling, and assembling). The video displays may be assembled by individuals of varying level of skill. The arranging of these video displays may require complex diagrams, may require several tools, and may be difficult to repair or replace.

In addition to limiting methods of arranging the video displays, rigidity may prevent aesthetic benefits associated with flexibility. Known systems do not adequately provide three-dimensional displays of two-dimensional videos and do not adequately permit rotation of displays. Also, known systems do not adequately permit video displays to be flexibly manipulated, rotated and/or otherwise simultaneously deployed between an extended position and a retracted position.

When video displays are partially assembled or fully assembled, inconsistent and/or undesired weight distribution can limit the size of the video displays. If the weight distribution puts stress on connectors in the video display, then the connectors can fail. Failure of connectors may result in failure of the video display.

Therefore, there is an unmet need to provide a display system, a display process and engagement feature capable of consistent simple and/or strong assembly that can be simultaneously deployed between an extended position and a retracted position.

SUMMARY OF THE INVENTION

In an exemplary embodiment, a method for deployment of a display system includes providing a first collection container for receiving a first display arrangement, and a second collection container for receiving a second display arrangement. The method further includes positioning the first collection container and the second collection container in close proximity to one another. The method further includes selectably engaging the first display arrangement to the second display arrangement and simultaneously deploying the first and second display arrangements.

BRIEF DESCRIPTION OF THE DRAWINGS

Wherever possible, the same reference numbers will be used throughout the drawings to represent the same parts.

DETAILED DESCRIPTION OF THE INVENTION

Provided is a display system, a display process for deploying the display system, and an engagement device capable of consistent simple and/or strong assembly. Embodiments of the present disclosure decrease the number and type of tools required for assembly, permit the ability to have flexible display arrangements capable of being simultaneously deployed between an extended position and a retracted position while retaining the desired display characteristics, permit selectable distribution of weight allowing the flexible display to provide an assembled set of display components that is large, permit flexible displays to extend tens or hundreds of feet in multiple dimensions, permit the reduction or elimination of the need for vertical supports within display devices thereby significantly reducing the weight of the overall system, permit a faster and/or more accurate assembly, permit assembly by personnel having little or no technical skill, and combinations thereof.

Figure 9:
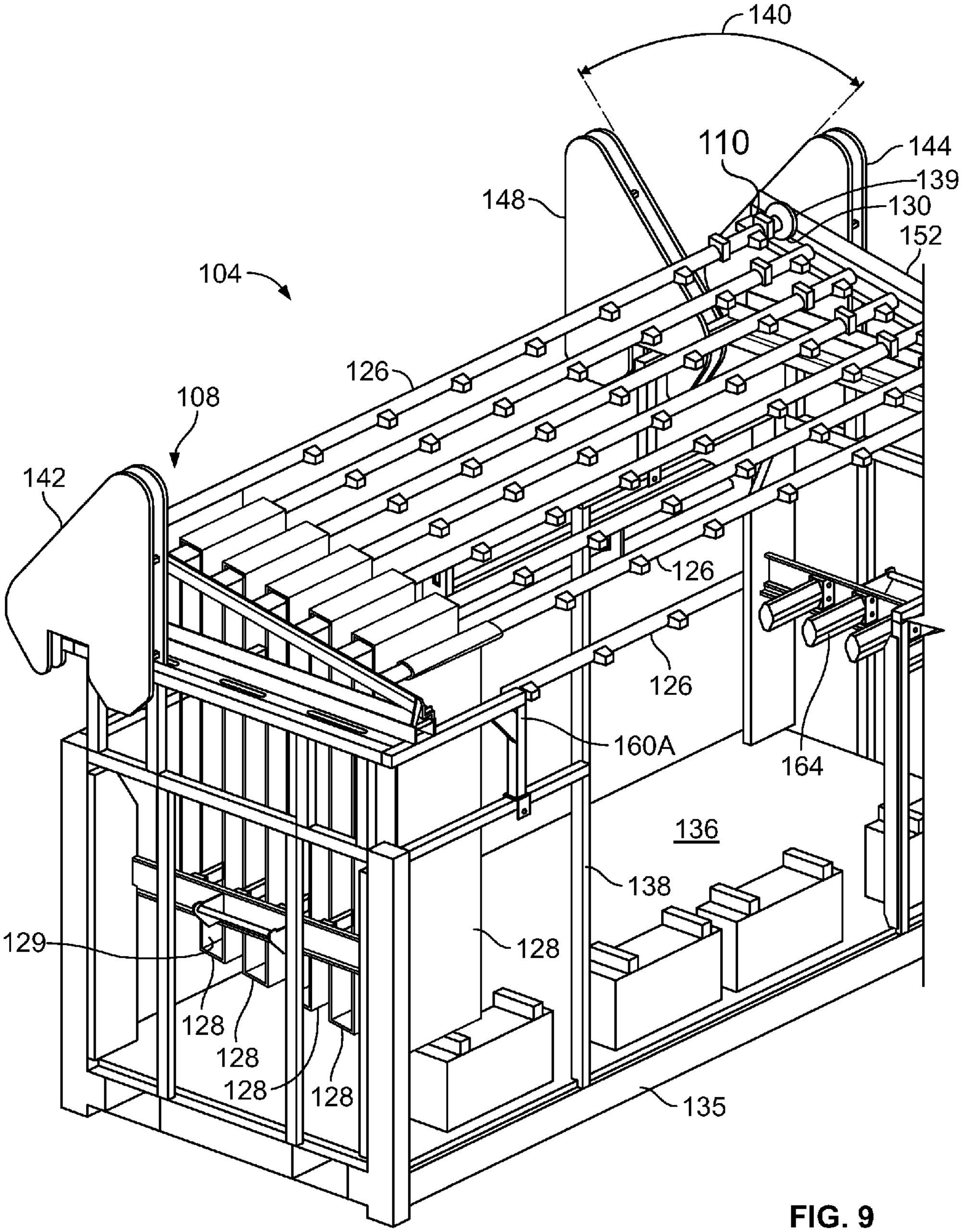
FIG. 9 illustrates a further enlarged partial perspective view of the exemplary embodiment of a video display system of FIG. 8 with a flexible display arrangement in a retracted position.

Referring to FIGS. 1-6, a display system 100 (shown as a video display system) includes a flexible support 103, a first display arrangement or first flexible display arrangement 101 and a second display arrangement or second flexible display arrangement 102 of display system 100 detachably engaged to flexible support 103, and an engagement device 110 for selectably engaging first flexible display arrangement 101 and second flexible display arrangement 102. The display system 100 is any suitable display. Suitable displays include videos, electronic media, lights, panels of lights, mirrors, paintings, printings, faux surfaces, temporary wall surfaces, temporary borders, and combinations thereof. The arrangement of system 100 can provide selective distribution of weight of the display arrangements (display arrangements 101, 102, 104 shown in FIG. 1). Flexible display arrangements 101, 102 (and other similarly situated display arrangements of display system 100) are capable of being simultaneously deployed between an extended position 106 and a retracted position 108 (FIG. 9).

Flexible support 103 can be a cable or cables configured to enable system 100 to be suspended from an architectural member (not shown). As shown in the figures, while flexible support 103 is being described as a cable or cables, the disclosure is not so limited. Flexible support 103 may be any elongate, flexible structure capable of bearing significant weight. For example, suitable flexible supports 103 may include, but are not limited to, flexible tapes, ropes, wires, other suitable flexible structures, or combinations thereof. The architectural member may be a steel beam, an existing stage system, another cable, a bridge, a wall, a telephone post, a trestle, a truss, other suitable type of architectural system, or combinations thereof. In one embodiment, flexible support 103 can be two weight-bearing cables suspended from the architectural member. Weight-bearing cables can be arranged such that flexible display device or flexible display arrangement 101, for example panels or other suitable light emitting devices, may be suspended from the architectural member. Flexible support 103 may be attached to the architectural member in any suitable manner. In an exemplary embodiment, flexible support 103 may be high strength cables capable of supporting the weight of panels and any additional equipment or components below the architectural member. In one embodiment, although not so limited, the cable is aircraft grade cable having an outer diameter of about ⅛ inch. As shown in an exemplary embodiment, flexible support 103 extends to an end connector 114 secured to a structural member 112 having a connector or structural fitting 116 (FIG. 6) that can then be connected to the architectural member.

Figure 2:
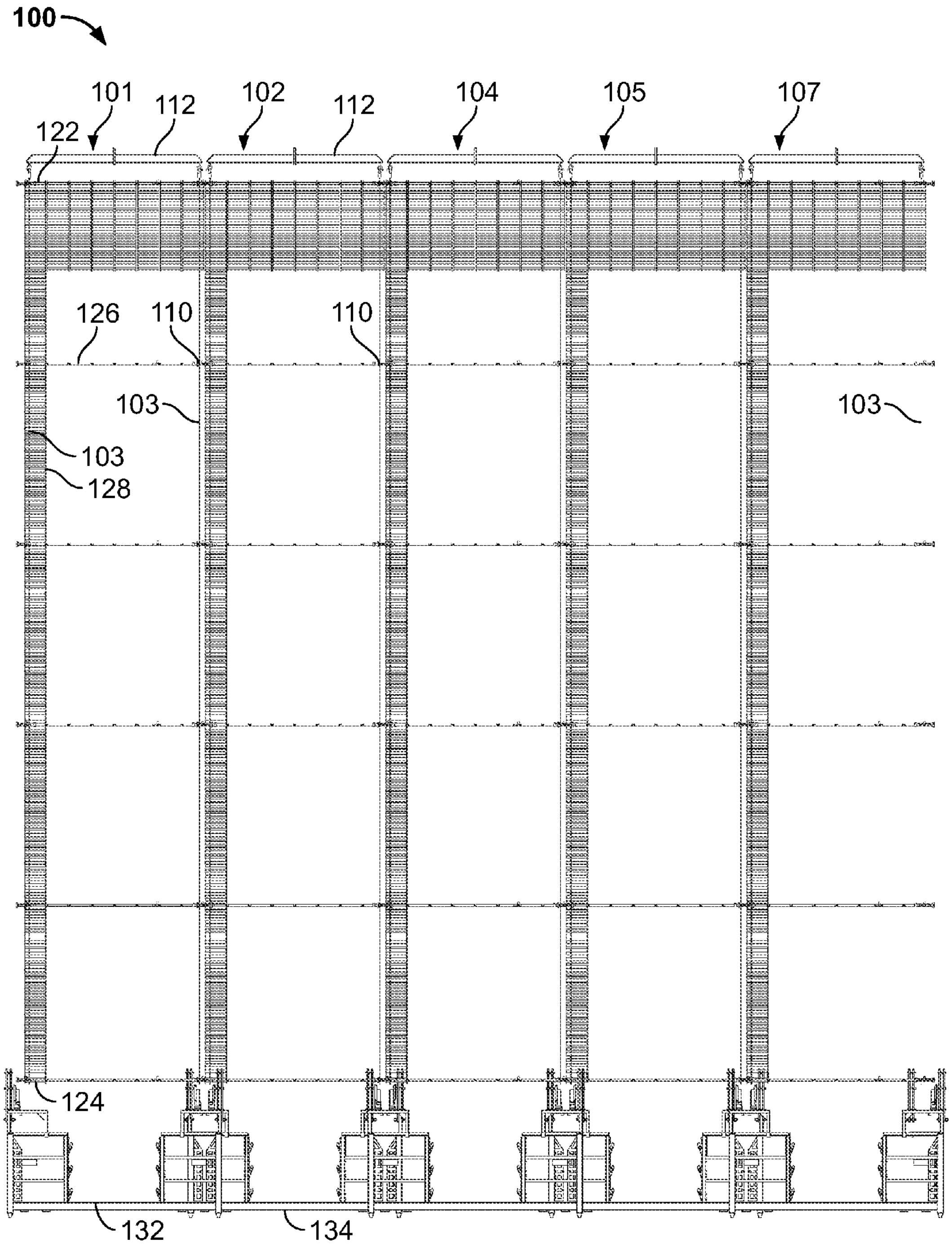
FIG. 2 illustrates a front view of the exemplary embodiment of a video display system of FIG. 1.
Figure 5:
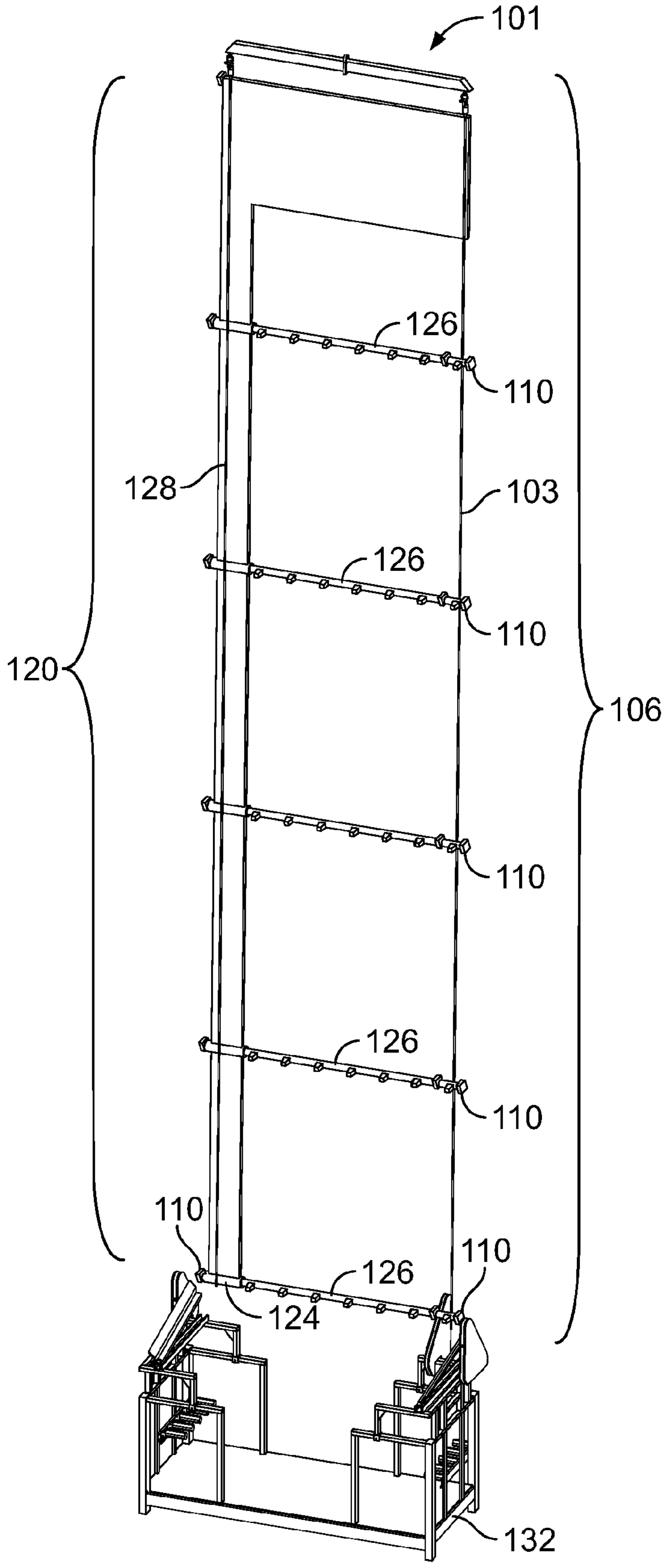
FIG. 5 illustrates a partial perspective view of the exemplary embodiment of a video display system of FIG. 1.
Figure 6:
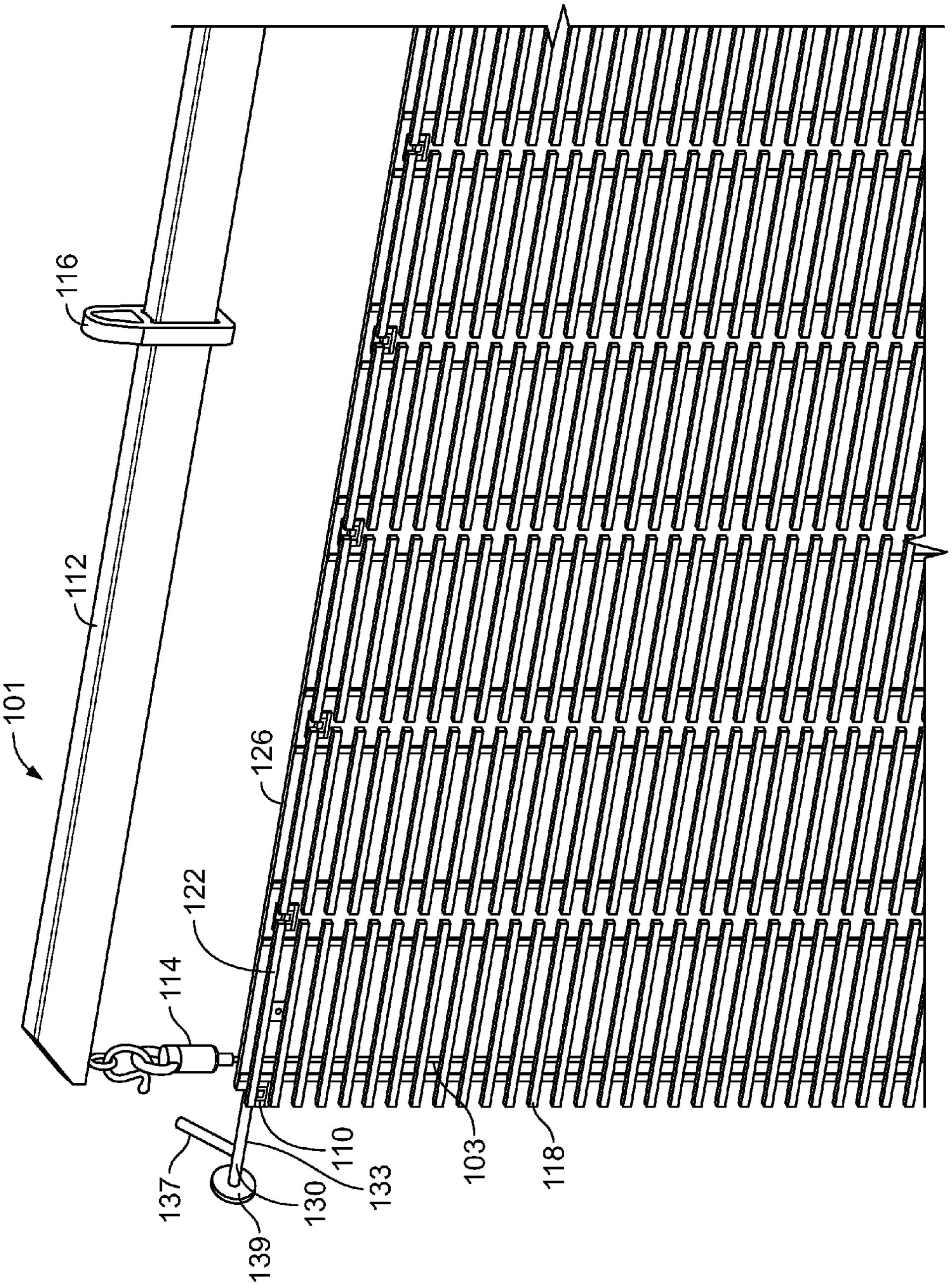
FIG. 6 illustrates an enlarged partial perspective view of the exemplary embodiment of a video display system of FIG. 1.

As further shown in FIGS. 2, and 5-6, first flexible display arrangement 101 can include a plurality of strips 120 of interconnected display segments 118 secured by flexible support 103. Strips 120 may extend continuously from a first end 122 in close proximity to end connector 114 located at or near the top of the first flexible display arrangement 101 to a second end 124 positioned at or near the bottom of the first flexible display arrangement. However as shown in the figures, strip portions 128 may be secured between secondary structural members 126 extending essentially the entire width of first flexible display arrangement 101, providing improved support and structural stability, and reducing the amount of flexure and "flapping" of strip 120 in an extended position 106, such as in response to wind.

In another embodiment, flexible support 103 may include power and/or signal functionality. For example, flexible support 103 may be one or more communication and/or power providing cables, such as fiber-optic or copper-based wires or cables, or Ethernet cables. The use of flexible support 103 can reduce the amount of weight in the system by removing bulky structural support systems like intermediate trusses. In addition, the use of flexible support 103 can permit flexibility for additional display options, such as rotating, bending, rounding, or flapping. For example, a rounded visual display may be formed using flexible support 103. In addition, the ability for flexible support 103 to curve can permit a display of a fixed image in motion, such as a flag appearing to wave in the wind. In another embodiment, system 100 can be moved by the motor or other device thereby creating a three-dimensional effect of the displayed image.

Referring to FIG. 2, flexible support 103 may be wires, such as power cords, run along-side cables and connected to a controller (not shown). In one embodiment, the wires and the cables may be integrated. In another embodiment, the wires may be integrated by being circumferentially bounded by cables thereby forming flexible support 103. In another embodiment, wires may act as flexible support 103.

In one embodiment, the flexible display arrangements may be powered by individual batteries housed with LEDs or other light sources. In another embodiment, LED can have a battery power source and another LED can use the battery as a power source by having wires carrying power from other LEDs.

Another embodiment includes OLEDs as LEDs. OLEDs may reduce power requirements and permit longer operation on the same charge. OLEDs may permit the flexible display arrangements to run on the same charge for a long period of time, for example, by providing power to the OLEDs and then disconnecting the power source from the OLEDs, and then displaying the system.

Figure 1:
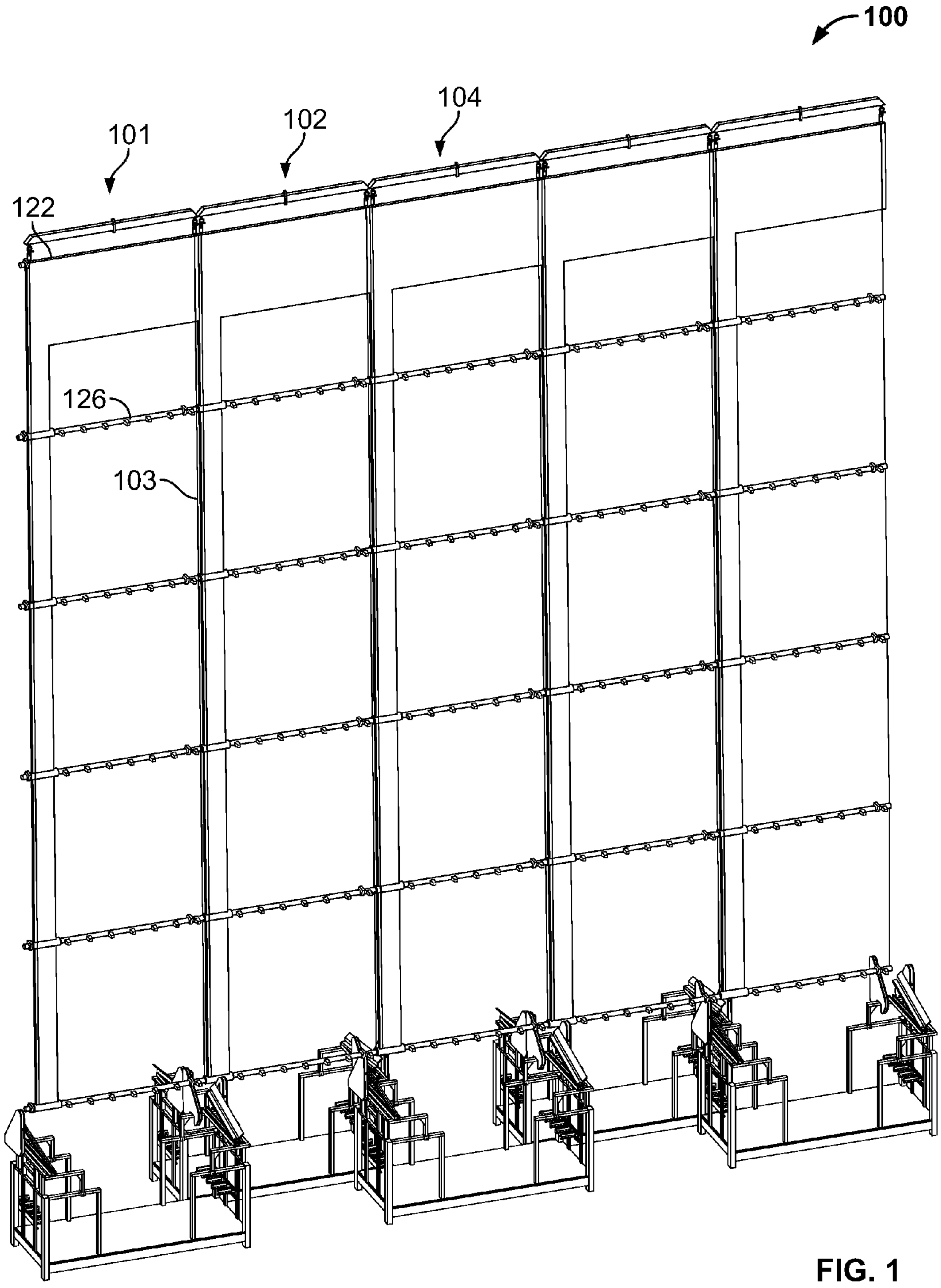
FIG. 1 illustrates a perspective view of an exemplary embodiment of a video display system.

Referring to FIGS. 1, and 5-6, for purposes including, but not limited to additional structural stability, such as reduced flapping when in the extended position 106, adjacent flexible display arrangements 101, 102 may be selectably engaged to each other by an engagement device 110 having an engagement feature. As shown in the figures, engagement device 110 is located at or near an end of secondary structural members 126. However, in other embodiments, corresponding engagement devices 110 of adjacent flexible display arrangements 101, 102 may be positioned between secondary structural members 126. In another embodiment, engagement device 110 may include an engagement feature having at least one magnet to secure the engagement device to either another corresponding engagement device having a corresponding engagement feature, or a different corresponding engagement device having an engagement feature such as a ferromagnetic material associated with an adjacent flexible display arrangement. In yet another embodiment, engagement device 110 may include an engagement feature that is a mechanical device capable of engaging a feature associated with an adjacent flexible display arrangement. The term mechanical device includes, but is not limited to, mechanical linkages, and/or apparatus including electromechanical devices, hydromechanical devices, magnets and/or electromagnets, valves, springs, pneumatically controlled devices and any combination thereof that permits selectable engagement/disengagement between adjacent flexible display arrangements. Such engagement/disengagement can be performed manually or performed automatically via controls of the display system. In yet a further embodiment, engagement/disengagement can be performed for a single engagement device or any number of engagement devices between adjacent flexible display arrangements.

Engagement devices 110 may further include or be positioned in close proximity to a second engagement device 130 for engaging a collection container, such as a first collection container 132. First collection container 132 is configured for receiving first flexible display arrangement 101 upon deployment of the first flexible display arrangement from an extended position 106 (FIG. 5) toward a retracted position 108 (FIG. 9). Similarly a second collection container 134 is configured for receiving second flexible display arrangement 102, positioned in close proximity to first flexible display arrangement 101, upon deployment of the second flexible display arrangement toward a retracted position 108 (FIG. 9). In another embodiment, first collection container 132 may be configured to receive first flexible display arrangement 101 and at least a portion of second flexible display arrangement 102. In an exemplary embodiment, each of first flexible display arrangement 101, second flexible display arrangement 102 and other similarly situated display arrangements are configured for simultaneous deployment between extended position 106 and retracted position 108. In one embodiment, simultaneous deployment is represented by each flexible display arrangement moving in a synchronous fashion with respect to one another between the extended position and the retracted position. However, in other embodiments, in which one or more flexible display arrangement has a total length different from at least one other flexible display arrangement, simultaneous deployment may be represented by each flexible display arrangement moving in a proportionally synchronous fashion with respect to one another between the extended position and a retracted position. However in yet other embodiments, depending upon the effect desired, simultaneous deployment may be represented by movement of the flexible display arrangements in a predetermined sequence, direction, and/or deployment velocity of one or more flexible display arrangements, such as may occur as part of a performance of a professional entertainer.

Figure 3:
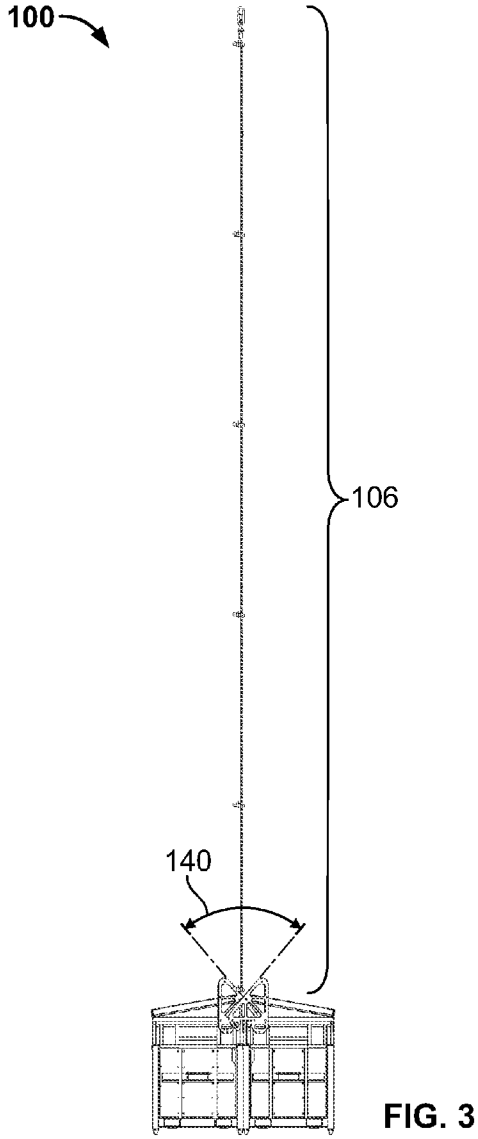
FIG. 3 illustrates an elevation view of the exemplary embodiment of a video display system of FIG. 1.
Figure 4:
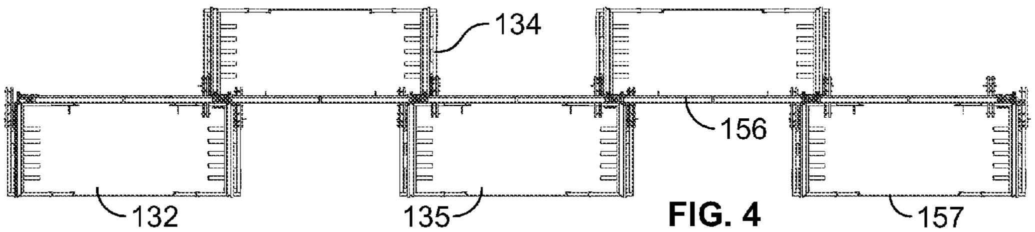
FIG. 4 illustrates a plan view of the exemplary embodiment of a video display system of FIG. 1.

System 100 of the present disclosure permits easy assembly and disassembly, enhancing portability of the system. That is, as shown in FIGS. 2-4, the display system includes flexible display arrangements 101, 102, 104, 105, 107 that may be simultaneously deployed (raised and/or lowered) from/into respective collection containers 132, 134, 135, 156, 157. And other embodiments, the number of flexible display arrangements and respective collection containers may each be greater than or less than five. By virtue of such simultaneous deployment of the flexible display arrangements, less time and fewer personnel are required to assemble and disassemble display system 100.

As shown in FIG. 4, collection containers 132, 134, 135, 156, 157 are interconnected to each other by alignment devices so that the collection containers are positioned in a staggered arrangement. In another embodiment, the collection containers can be aligned with each other. As further shown in FIG. 7, third collection container 135 has a base 136 for supporting an outwardly extending framework 138. Framework 138 includes an extension framework 160A at or near one end of framework 138 and an extension framework 160B at or near an opposite and a framework 138. In one embodiment, extension frameworks 160A, 160B may be detachable from framework 138, if desired, to reduce the size of third collection container 135, such as during manufacture of the container. Extension framework 160A includes a first alignment device 142 and extension framework 160B includes a second alignment device 144. As further shown in FIGS. 7 and 10, fourth collection container 156 (not shown in FIG. 7) includes a second alignment device 148 having an interconnection region 150 for engaging extension framework 160B of third collection container 135. The facing surfaces of alignment devices 144, 148 define a V-shaped alignment feature subtending an angle 140. Similarly, as further shown in FIG. 7, second collection container 134 includes a first alignment device 146 having an interconnection region (not shown in FIG. 7) for engaging extension framework 160A of third collection container 135. The facing surfaces of alignment devices 142, 146 define a V-shaped alignment feature subtending an angle 140 that is aligned with the V-shaped alignment feature defined by the facing surfaces of alignment devices 144, 148. As further shown in FIG. 7, the alignment devices are identical or substantially similar to each other to reduce manufacturing costs. In other embodiments, the alignment devices may be different from each other. The size of the angle 140 formed between the facing surfaces of corresponding alignment devices can be about 90°, although in other embodiments, the size of angle 140 can be greater than or less than 90°. Angle 140 defining the V-shaped alignment feature is utilized to receive second end 124 of third flexible display arrangement 104, which also corresponds to secondary structural member 126, as the flexible display arrangement is deployed between extended position 106 (FIG. 3) and retracted position 108 (FIG. 9).

Figure 7:
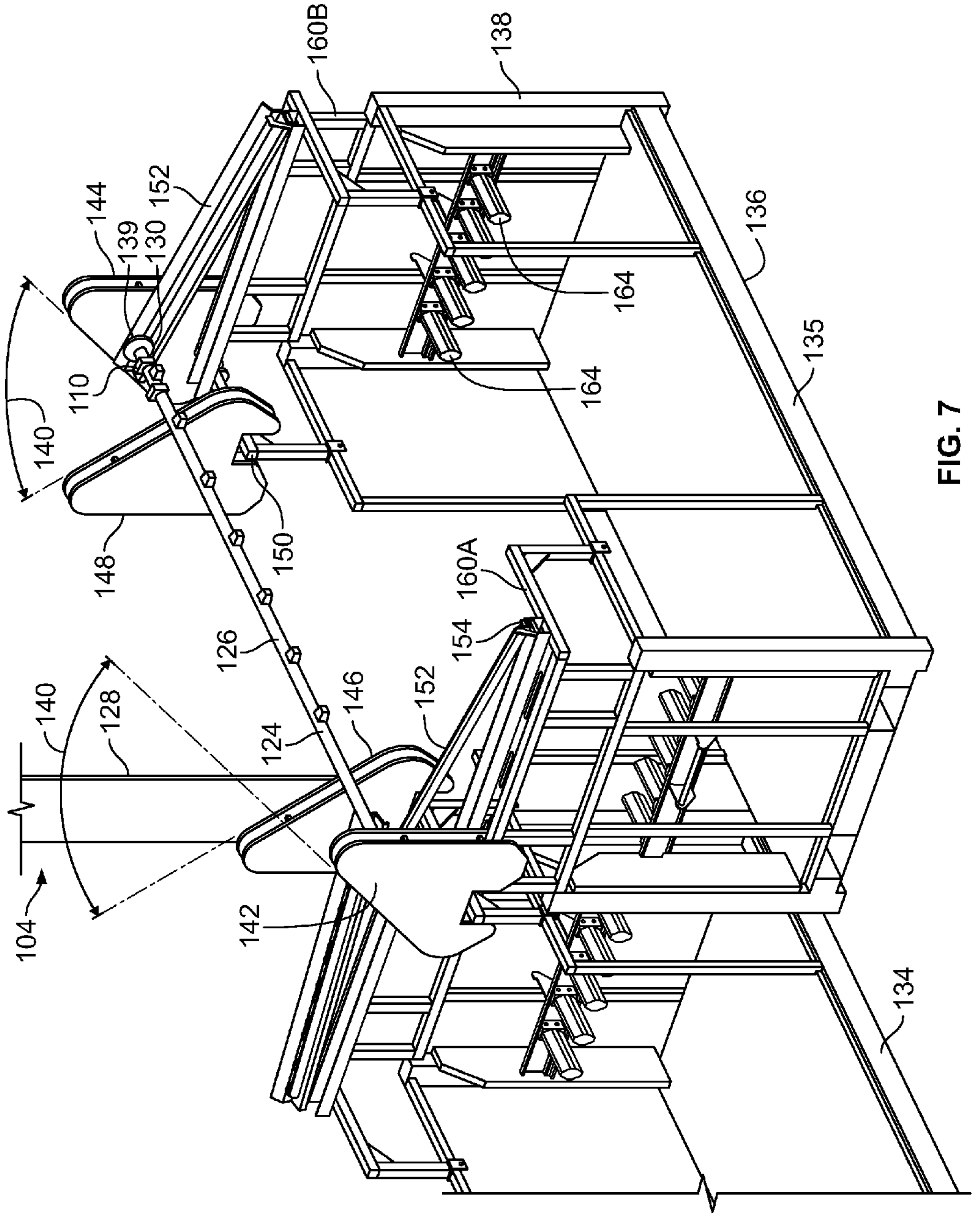
FIG. 7 illustrates a partial perspective view of the exemplary embodiment of a collection container.
Figure 8:
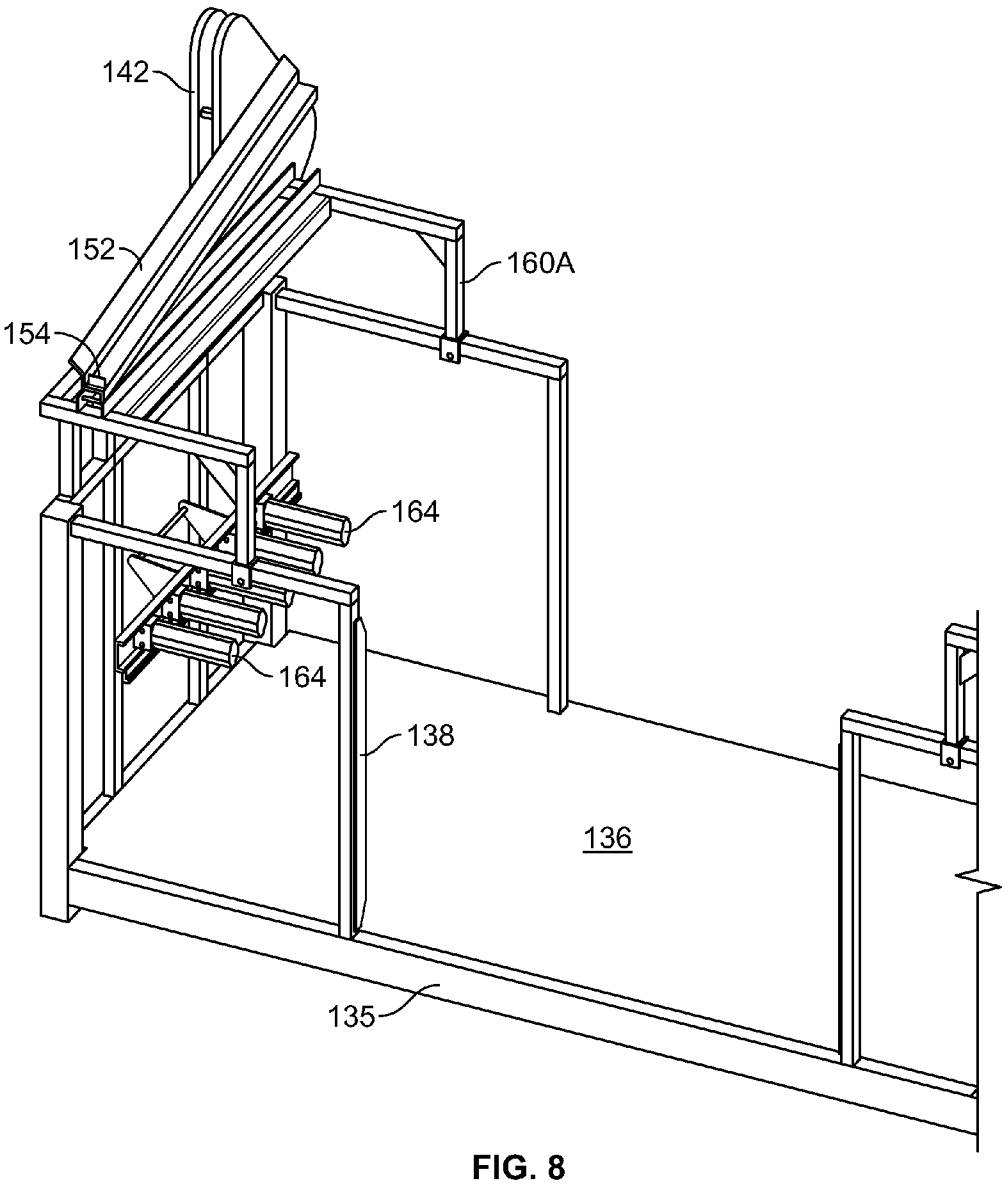
FIG. 8 illustrates an enlarged partial perspective view of the exemplary embodiment of a video display system of FIG. 7.

As further shown in FIGS. 7-9, deployment of system 100 from extended position 106 (FIG. 3) toward retracted position 108 (FIG. 9) is achieved as second end 124 of third flexible display arrangement 104 is lowered (the other flexible display arrangements being simultaneously lowered, but not shown in FIGS. 7-9) such as by a motor or winding mechanism (not shown), and guided by the V-shaped alignment features or angles 140 into third collection container 135. Upon the sufficient lowering of third flexible display arrangement 104, the V-shaped alignment features or angles 140 defined by alignment devices 142, 146 and 144, 148 guide second end 124 of third flexible display arrangement 104 having an engagement device 110 including engagement features toward and into contact with a collection device 152. More specifically, such as further shown FIG. 6, engagement device 110 includes a second engagement device 130 extending outwardly from flexible display arrangement 101 (which is similar to flexible display arrangement 104). As further shown in FIG. 6, engagement device 130 includes a shaft 133 connected at one end to engagement device 110 and securing an engagement member 139 at or near the other end of engagement device 130, such as a wheel that is rotatable about the axis defined by shaft 133. In another embodiment, engagement member 139 is not required, and in another embodiment, engagement member 139 is not a wheel, but a member that does not rotate, about the axis of shaft 133. For example, engagement member 139 may slide along the surface of collection device 152, instead of rotating about the axis of shaft 133. As yet further shown in FIG. 6, a spacer 137 extends outwardly from shaft 133, and its function will be described in further detail below.

It is to be understood that engagement device 110 may incorporate engagement features previously discussed pertaining to engagement device 130. In addition, in other embodiments, the engagement features.

As further shown in FIGS. 7-9, the engagement features, such as engagement member 139 of engagement device 130 of third flexible display arrangement 104 are guided by the alignment devices into contact with collection device 152, such as a pair of sloped structural members, which include but are not limited to angle members. As third flexible display arrangement 104 is further lowered with respect to third collection container 135, by force of gravity, engagement members 139 contact and begin to guidingly move along the sloped surfaces of the corresponding collection devices 152 toward a stop 154 (FIG. 8) positioned at or near the lower end of the collection devices 152. As previously discussed, relative movement of engagement members 139 along corresponding collection devices 152 may occur by virtue of a rolling or a sliding contact therebetween. As previously discussed, engagement features of engagement device 110 can include any combination of mechanical devices and the like, including, but not limited to other types of features, such as magnets for engagement/disengagement between adjacent flexible display arrangements prior to deployment of the flexible display arrangements. Additionally, such engagement features of engagement device 110 may be manually or automatically controlled in various exemplary embodiments of the present disclosure. In additional embodiments, engagement features may include retractable features such that the engagement device may be removed from view of the casual observer, i.e., rotate behind the flexible display arrangement, axially retract or other means of retraction In another embodiment, the engagement features may be of sufficiently small size so that retraction or removal by another method is not required. It is to be understood that if engagement features between adjacent flexible display arrangements are utilized, those engagement features must be disengaged prior to loading the flexible display arrangements into adjacent collection containers (assuming that the adjacent flexible display arrangement cannot be loaded into the same collection container).

Further referring to FIGS. 7-9, in response to engagement device 110 contacting stop 154 of collection device 152 and yet further lowering of third flexible display arrangement 104, strip portions 128 begin to form a loop 129 (FIG. 9). Upon loop 129 achieving sufficient "droop", the loop 129 contacts a divider 164 intruding inwardly from framework 138 of third collection container 135. Divider 164 separates and helps protect adjacent loops 129 of strip portions 128 that are collected inside of third collection container 135 as third flexible display arrangement 104 is further lowered into third collection container 135. As further in shown FIG. 9, a loop 129 is fully formed when engagement devices 110 of adjacent secondary structural members 126 are brought into contact with corresponding collection devices 152. If properly sized and/or adjusted, adjacent loops 129 are separated by adjacent dividers 164. For example a spacer 137 (FIG. 6) may be used to control the spacing between adjacent secondary structural members 126, although other features of engagement devices 110 may also be used for this purpose. Another embodiment, dividers 164 are movable as required to separate adjacent loops 129. By separating adjacent loops 129 in the collection containers, the flexible display arrangement is less susceptible to damage during transportation/storage of the containers. Once secondary structural member 126 corresponding to first end 122 is brought into contact with collection device 152 and disconnected from structural member 112 (FIG. 6), the flexible display arrangement is now in retracted position 108.

It is to be understood that by reconnecting structural member 112 with the secondary structural member 126 corresponding to first end 122 (FIG. 6), and raising the secondary structural member 126, the flexible display arrangement can be deployed from the retracted position 108 toward the extended position 106. Further, for any position of the flexible display arrangement between retracted position 108 and extended position 106, a reversal of the direction of movement of the flexible display arrangement with respect to the respective collection container similarly results in a reversal of deployment direction between a retracted position 108 and the extended position 106.

Figure 10:
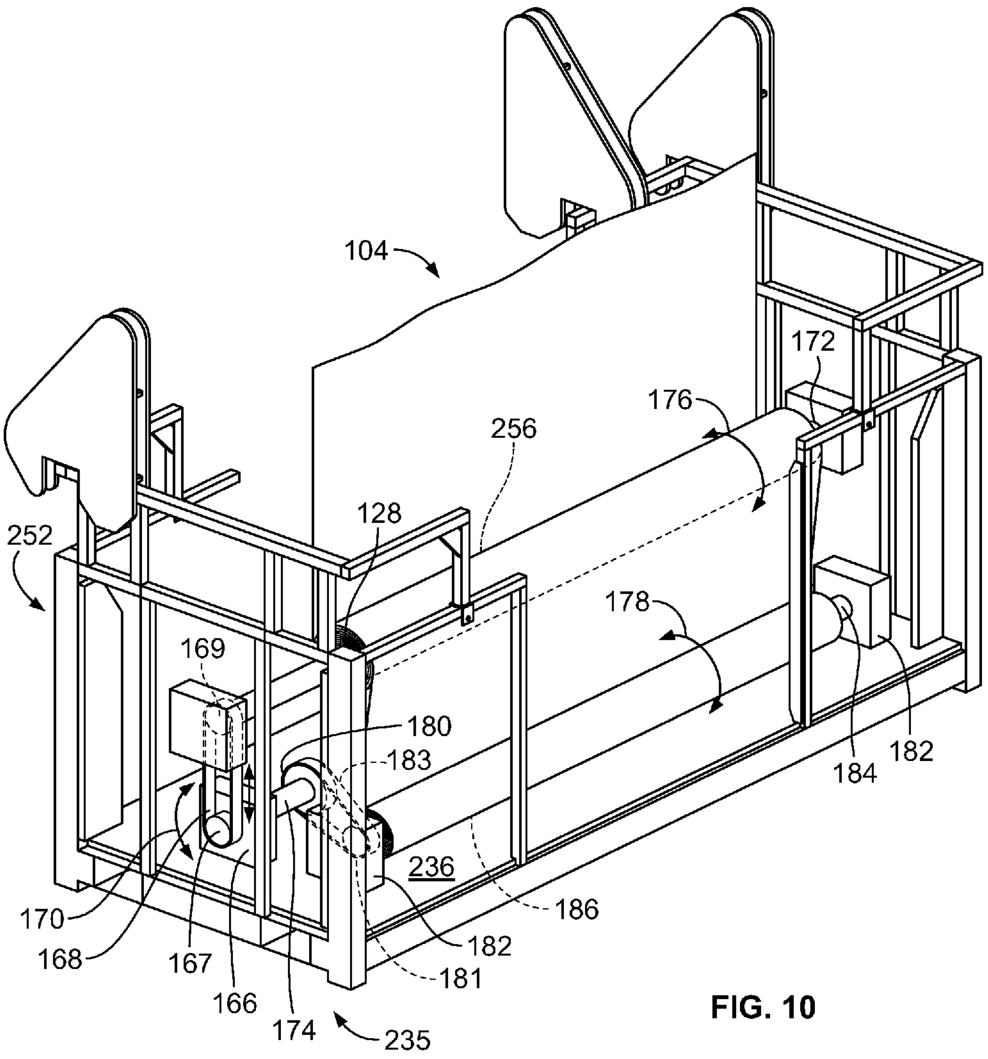
FIG. 10 illustrates a perspective view of an exemplary embodiment of a deployment arrangement of a flexible display arrangement of a video display system.

As shown in FIG. 10, an alternate embodiment of collection device 252 is discussed for deploying into/from collection container 235. Collection device 252 includes a motor 166 secured inside of collection container 235 that urges a pulley 167 into rotational movement about an axis. Pulley 167 meshes with a pulley 169 via a belt 168, and in response to a rotational movement 170 of pulley 167, pulley 169 is similarly urged into similar movement, as is a shaft 172 that is secured to pulley 169. In response to rotational movement 170 in one direction, third flexible display arrangement 104 is rotatably collected about shaft 172 in a rotational movement 176 inside of collection container 235, the strip portion 128 of third flexible display arrangement 104 that has been rotatably collected is identified as rotatably collected display arrangement 256. Optionally, motor 166 rotatably drives a shaft 174 having a pulley 180 at or near one end of shaft 174 that is opposite of motor 166. A pair of bases 182 rotatably secure a shaft 184 therebetween. One end of shaft 184 is securely connected to a pulley 181 that is in meshing contact with pulley 180 via a belt 183. In response to driven rotational movement of shaft 174, shaft 184 is urged into rotational movement 178. A sheet of material 186 wrapped around shaft 184 and is also secured to shaft 172. As a result, in response to the third flexible display arrangement 104 being rotatably collected about shaft 172 inside of collection container 235, material 186 is simultaneously being rotatably collected about shaft 172, material 186 providing a protective layer between adjacent layers of rotatably collected display arrangement 256. Conversely, in response to deployment of the third flexible display arrangement 104 about shaft 172 from collection container 235, i.e., the third flexible display arrangement 104 being deployed toward the extended position 106, material 186 is simultaneously unrolled from shaft 172 and rolled onto shaft 184.

Figure 11:
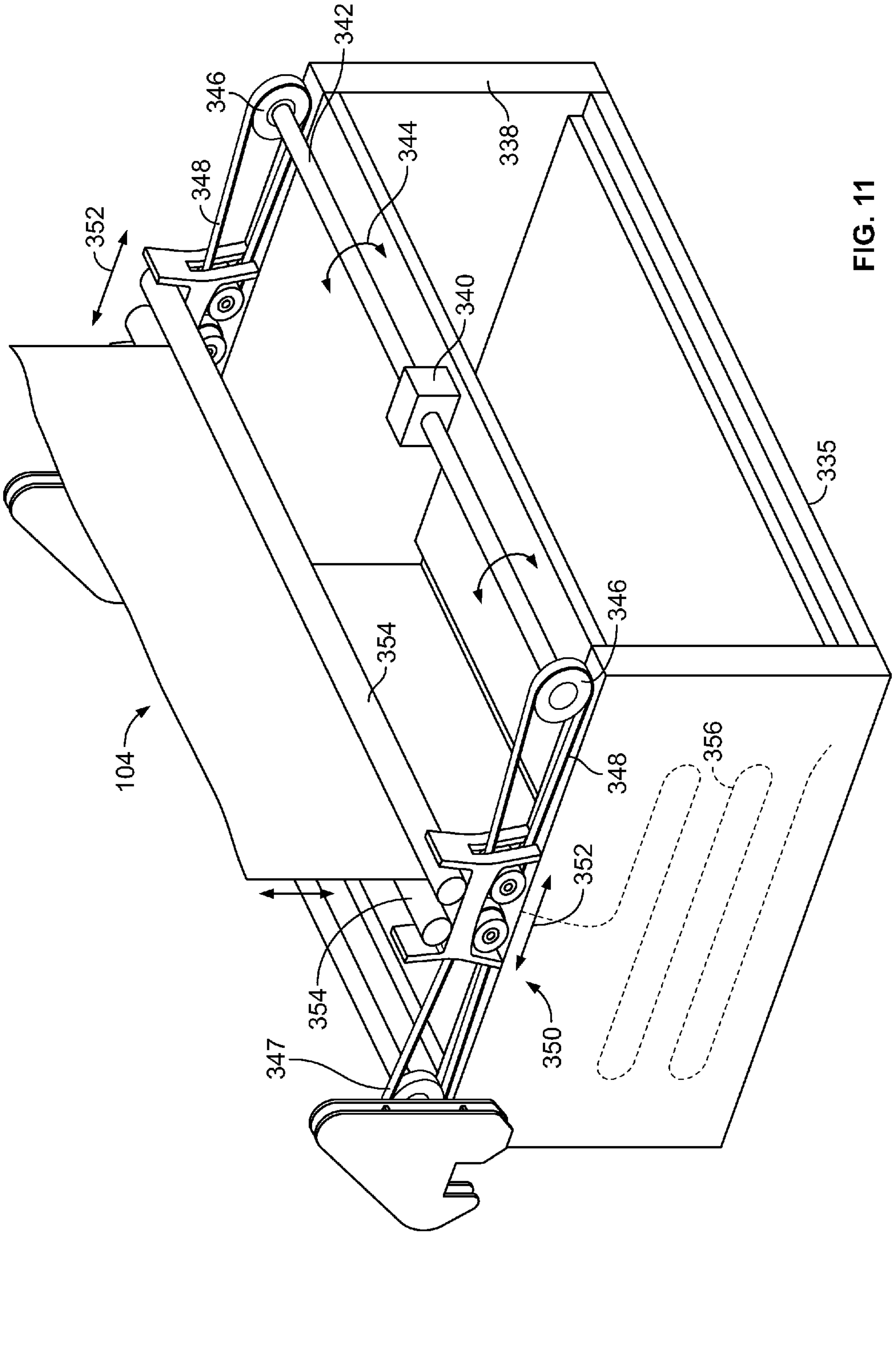
FIG. 11 illustrates a perspective view of another exemplary embodiment of a deployment arrangement of a flexible display arrangement of a video display system.

As shown in FIG. 11, a further alternate embodiment of collection device 349 is discussed for deploying the third flexible display arrangement 104 into/from collection container 335. Collection device 349 includes a motor 340 secured inside of collection container 335 that urges a pair of pulleys 346 into rotational movement about shaft 342. Pulleys 346 each mesh with a pulley 347 (only one pulley 347 shown in FIG. 11) rotatably secured by support framework 338 of collection container 335 via a respective belt 348, and in response to a rotational movement 344 of pulleys 346, pulleys 347 are similarly urged into similar movement. An oscillating guide 350 secures a pair of guide rods 354 and a spacing between the guide rods 354 sufficient for the third flexible display arrangement 104 to pass between the guide rods 354. Each of opposed ends of oscillating guide 350 are secured to a belt 348, such that rotational movement 344 about shaft 342 controls the position of the oscillating guide 350. In coordinated response to deployment of the third flexible display arrangement 104 into/out of collection container 335 by the system (not shown), motor 340 urges shaft 342 into rotational movement 344 to similarly urge pulleys 346 into rotational movement, resulting in alternating axial movement directions 352 of belt 348. When the third flexible display arrangement 104 is deployed toward a retracted position 108, in combination with collection device 349 operated as described above, the resulting collected third flexible display arrangement 356 accumulates in alternately arranged substantially horizontally disposed rows inside of collection container 335. Conversely when the third flexible display arrangement 104 is deployed toward an extended position 106, in combination with collection device 349 operated as described above, the resulting collected third flexible display arrangement 356 is incrementally removed from inside of collection container 335. Optionally (not shown) two protective material layers could be applied to protect each side of collected third flexible display arrangement 356, dispensed in a manner similar to that previously discussed with respect to FIG. 10. It is to be understood that two protective material layers are required, instead of the one protective material layer as disclosed in FIG. 9, due to the arrangement of the collected third flexible display arrangement 356.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for deployment of a display system in a generally vertical display plane, comprising:

providing a first collection container for receiving a first display arrangement, and a second collection container for receiving a second display arrangement; said display plane being formed as a result of the first and second display arrangements being detachably engaged with a flexible support having connecting means suspending from an architectural member;

positioning the first collection container and the second collection container adjacent to one another, the first collection container and the second collection container each being in alignment with the display plane such that as the first display arrangement is being collected in the first collection container and the second display arrangement is being collected in the second collection container, the first display arrangement is directed in a first direction away from the display plane and the second display arrangement is directed in a second direction opposite the first direction away from the display plane such that upon collection, the first display arrangement is positioned on one side of the display plane and the second display arrangement is positioned on an opposite side of the display plane;

selectably engaging the first display arrangement to the second display arrangement, thereby forming a continuous display; and simultaneously deploying the first and second display arrangements between an extended and retracted position respectively and engaging the first and second display arrangements with said flexible support having connecting means suspending from the architectural member, thereby arranging the continuous display in the generally vertical display plane.

2. The method of claim 1, wherein prior to simultaneously deploying the first and second display arrangements, the first and second display arrangements are connected to said flexible support having connecting means suspending from the architectural member.

3. The method of claim 1, wherein the first and second collection containers each include alignment device, wherein the alignment device of the first collection container is substantially similar to the alignment device of the second collection container.

4. The method of claim 1, wherein facing surfaces of a corresponding alignment device of the first collection container and the second collection container define an alignment feature.

5. The method of claim 4, wherein the alignment feature receives an end positioned at or near the bottom of one of the first display arrangement and the second display arrangement.

6. The method of claim 5, wherein the alignment feature includes a collection device for receiving the end of one of the first display arrangement and the second display arrangement.

7. The method of claim 1, wherein upon the first and second display arrangements being deployed to a retracted position, the system is dissembled.

8. The method of claim 1, wherein positioning the first and second collection containers includes interconnecting the first and second collection containers.

9. The method of claim 1, wherein positioning the first and second collection container includes interconnecting the first and second collection containers in a staggered arrangement.

10. The method of claim 8, wherein the first and second collection containers each include an alignment device.

11. The method of claim 7, wherein disassembly of the system includes disconnecting the first display arrangement and the second display arrangement from said flexible support having connecting means suspending from the architectural member;

moving the previously positioned first collection container relative to the second collection container.

* * * * *